United States Patent [19]
Hazebrook

[11] Patent Number: 4,611,373
[45] Date of Patent: Sep. 16, 1986

[54] METHOD OF FORMING A PRECISION BALL TRACK

[75] Inventor: Daniel W. Hazebrook, Detroit, Mich.

[73] Assignee: GKN Automotive Components, Southfield, Mich.

[21] Appl. No.: 801,494

[22] Filed: Nov. 22, 1985

Related U.S. Application Data

[63] Continuation of Ser. No. 588,514, Mar. 12, 1984.

[51] Int. Cl.$^4$ .................. B21D 53/12; B21K 1/04; B21K 1/05; B23P 13/02
[52] U.S. Cl. .................. 29/148.4 C; 29/148.4 R; 29/558; 403/57; 403/74; 464/145; 464/906
[58] Field of Search .................. 29/148.4 C, 148.4 R, 29/558; 403/57, 74; 464/145, 906

[56] References Cited

U.S. PATENT DOCUMENTS

| 1,665,280 | 4/1928 | Rzeppa | 464/906 X |
| 2,046,584 | 7/1936 | Rzeppa | 464/906 X |
| 2,322,570 | 6/1943 | Dodge | 464/906 X |
| 3,367,139 | 2/1968 | Ristau | 464/906 X |

FOREIGN PATENT DOCUMENTS 1446159 8/1976 United Kingdom ............... 464/145

Primary Examiner—Mark Rosenbaum
Assistant Examiner—P. Wallace
Attorney, Agent, or Firm—Remy J. VanOphem

[57] ABSTRACT

A method for forming a precision ball groove track in a part, especially in an outer race member of a universal joint. The method includes the steps of forming a recess groove in the ball race groove track and ball finish machining the race groove track to a predetermined precision shape, the recess reducing groove the wear on the finish machining tool used during the finish machining step.

15 Claims, 3 Drawing Figures

4,611,373

METHOD OF FORMING A PRECISION BALL TRACK

This is a continuation of application Ser. No. 588,514, filed Mar. 12, 1984, now abandoned.

BACKGROUND OF THE INVENTION

The present invention relates to methods for forming precision ball race groove tracks in a part, especially in the outer race member of a universal joint.

There are many mechanical parts having ball race groove tracks formed therein for engagement with bearing balls. The ball race groove tracks may be produced by various methods including formation of the ball race groove track with the part when the part is forged or cast, grinding, machining or cold forming the track into a rough workpiece, or cold forming or forging an initial roughly proportioned track during the formation process for the part and subsequently grinding or machining the formed ball track into a precision shape. The last mentioned methods are the most common when a precision shape for the ball race groove track is required since an accurately dimensioned ball race groove is produced without a substantial waste of material. Furthermore, these methods of producing a ball race groove cause less wear on the grinding machining tool than is the case when the ball race groove track is ground in a workpiece not having an initially formed ball race groove track therein.

Precision ball race groove tracks are required, for example, for universal joints of the type having spherically engaged inner an outer race members coupled to each other by a plurality of bearing balls disposed in ball engaging meridian race grooves in the inner and outer race members. Examples of this type of universal joint may be found in U.S. Pat. No. 2,046,584, issued July 7, 1936 to Alfred H. Rzeppa and in U.S. Pat. No. 1,665,280, issued Apr. 10, 1928 to the same inventor. A significant advantage of this type of construction for a universal joint is that it has a constant velocity property. That is, the speed of rotation of the shaft interconnected with the inner race member is the same as that of the shaft interconnected with the outer race member, regardless of the relative angular position between the inner and outer race members within a predetermined range of relatived angular positions.

For this reason, this type of universal joint has become popular for use in front wheel drive assemblies for motor vehicles.

The typical constant velocity universal joint of the above described type, often referred to as a Rzeppa joint, requires six precision meridian ball tracks in a spherical cavity in an outer race member as well as six precision meridian ball tracks formed in the outer spherical surface of an inner race member. These tracks are initially formed in the inner and outer race members when the parts are forged or cast and are subsequently finish machined to produce a desired precision shape for each of the ball tracks. During the grinding or finish machining operation, a portion of the working surface of the tool is worn, thus, requiring periodic replacement of the tool in order to maintain the accuracy of the finish machining or grinding operation. Such periodic replacement is expensive in terms of the cost of replacing the tool and in terms of the loss of operating time while the tool is being replaced.

When a ball race groove track is formed in such a part by a cold forming operation, the metal of the part is substantially displaced, particularly in the region of the apex of the ball track. The metal in the region of the apex of the ball race groove track offers the greatest resistance to the formation of the ball race groove track. Thus, some relief in the region of the apex of the ball race groove track would be advantageous in order to facilitate the formation process.

When a ball race groove track is to be ground in such parts, a grinding tool is rotated about an axis extending outwardly from the apx of the ball track. Thus, the portion of the grinding tool in the vicinity of the apex of the ball race groove track is moving comparatively slowly and encounters the greatest amount of friction. The friction in the region of the apex of the ball track causes rapid deterioration of the grinding tool, thereby requiring frequent replacement of the grinding tool and a large amount of down time. This friction also creates heat which may generate cracks in the part. Thus, each part must be carefully inspected for microscopic cracks. A noticeable amount of scrap results from the detection of such microscopic cracks during such inspections, increasing the manufacturing costs per part. Quality control problems may also be encountered as a result of undetected flaws.

Accordingly, what is needed is a method for producing ball race groove tracks in Rzeppa joints and similar constant velocity universal joints, as well as other machine elements requiring precision ball race groove tracks, which method reduces the amount of wear on the grinding or finish machining tool, and the amount of scrap resulting during the manufacture of such ball race groove tracks.

SUMMARY OF THE PRESENT INVENTION

The present invention provides a method for producing a precision ball race groove track in a workpiece, which method results in less wear of the tool used for grinding or finish machining the ball race groove track, as compared to methods of the prior art, facilitates the cold forming operation, and is less likely to introduce microscopic cracks into the workpiece. The method of the present invention is particularly advantageously used for producing an outer race member of a constant velocity universal joint, such as a Rzeppa joint.

According to the method of the present invention, the workpiece is originally formed with a formed ball race groove track and a formed relief groove in the formed ball race groove track and extending therealong. The ball race groove track is subsequently ground or finish machined to a predetermined precision shape to produce a precision ball race groove track. The relief groove reduces the wear on the finish machining or grinding tool by reducing the amount of surface area engaged by the tool in the area of greatest resistance to machining or grinding. Furthermore, the relief groove enhances metal flow at the apex of the ball race groove track during the cold forming operation.

Preferably, the recess groove extends along the apex of the ball race groove, since this is the area where the greatest amount of resistance will be offered by the part to the cold forming device or the finish machining or grinding tool.

In the preferred embodiment, an outer race member of a constant velocity universal joint is formed having a plurality of spaced apart meridian ball race grooves, each of the plurality of spaced apart meridian ball race grooves having a meridian relief groove formed in the apex thereof. Each of the plurality of spaced apart meridian ball race grooves are finish machined or ground to a precision shape to produce a plurality of precision ball race groove tracks.

The inner race member of a constant velocity universal joint is produced similarly by forming the inner race member with a plurality of spaced apart meridian ball race grooves therein, each having a meridian relief groove formed in the apex thereof and grinding the plurality of spaced apart meridian ball race grooves to a predetermined precision shape to produce a plurality of precision ball race groove tracks.

A principal object of the present invention is to provide a method for forming a precision ball race groove track in a part, which method increases the effective life of a finish machining or grinding tool used to produce the precision ball race groove track thereby reducing the down time of the production machinery used and increasing the production rate available from the production machinery.

Another object of the present invention is to provide a method for forming an inner race member and a method for forming an outer race member of a universal joint having a series of ball engaging meridian race grooves in the inner and outer race members.

Still another object of the present invention is to provide a precision inner race member and a precision outer race member for a constant velocity universal joint of the type having a series of ball engaging meridian race grooves formed in the inner and outer race members.

Yet another object of the present invention is to provide a method for forming a precision ball race groove track in a part, which method enhances the formation of the precision ball race groove track by a cold forming operation.

These and the many other objects, features and advantages of the present invention will become apparent to those skilled in the art when the following detailed description is read in conjunction with the drawings appended hereto.

DETAILED DESCRIPTION OF THE PREFERRED EMBODIMENT

Figure 1:
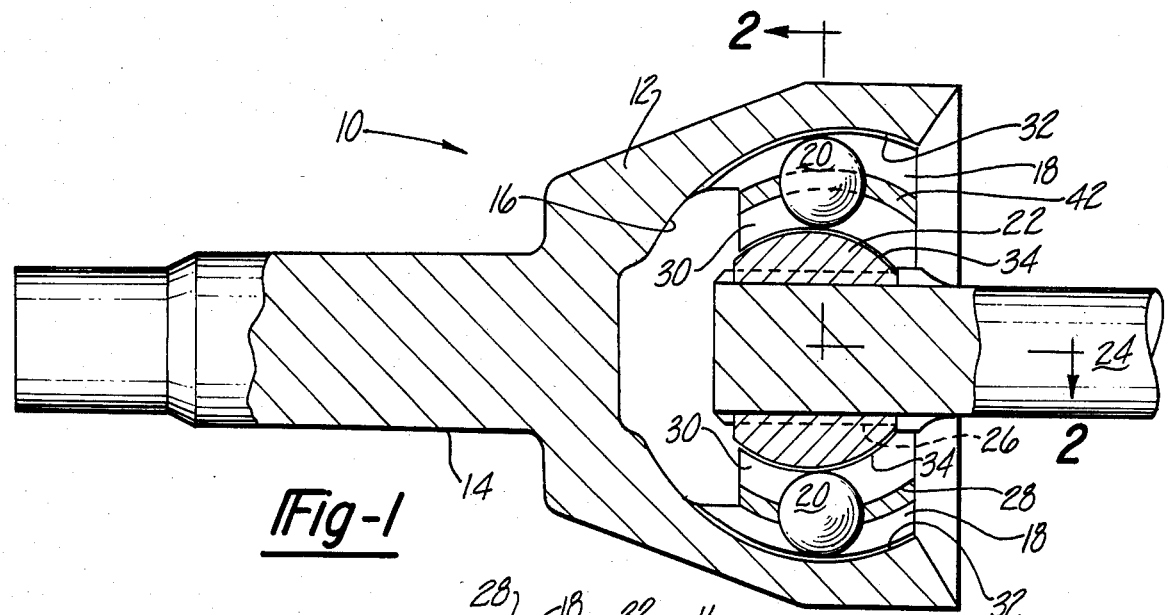
FIG. 1 is a partial cutaway side view of a constant velocity universal joint made according to the method of the present invention.
Figure 2:
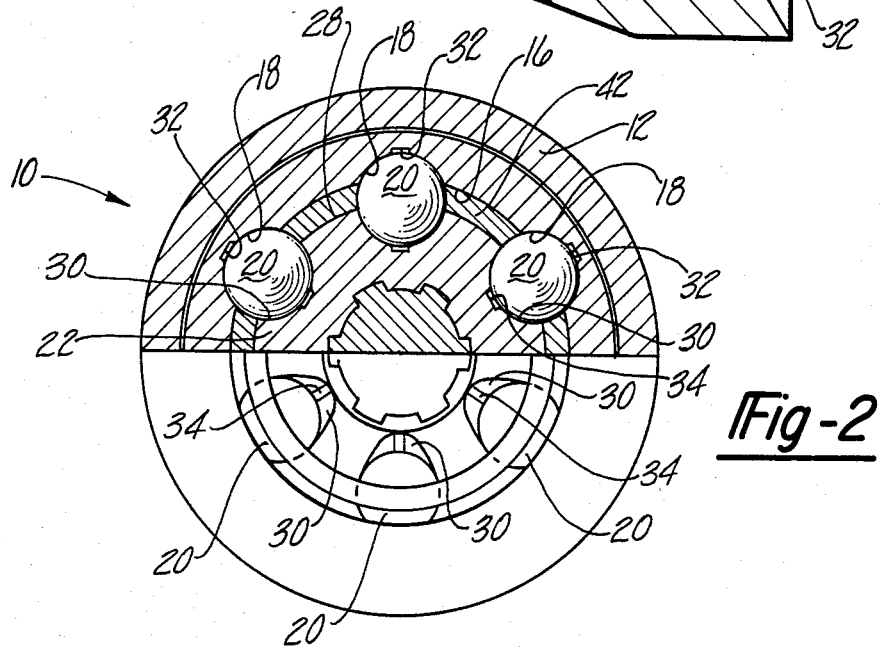
FIG. 2 is a sectional view taken along line 2—2 of FIG. 1.

Referring now to the drawing and more particularly to FIGS. 1 and 2 thereof, a constant velocity universal joint 10 of the Rzeppa type is illustrated. Since the constant velocity universal joint 10 is well known in the art, it is neither illustrated nor described in detail herein.

The constant velocity universal joint 10 includes an outer race member 12 having an integral shaft 14 extending in a first direction therefrom. A spherical cavity 16 is formed in the outer race member 12. The spherical cavity 16 opens in a second direction opposite the first direction.

As shown in FIGS. 1 and 2, first ball groove tracks 18 are formed in the outer race member 12 for a series of bearing balls 20. The first ball groove tracks 18 form a series of ball engaging meridian race grooves and have a gothic arch shape.

An inner race member 22 is provided within the spherical cavity 16 of the outer race member 12. The inner race member 22 is mounted to a shaft 24 by means of cooperating splines 26. The inner race member 22 is provided with an outer spherical surface 28 having a diameter substantially smaller than the diameter of the spherical cavity 16 of the outer race member 12.

Second ball groove tracks 30 are formed in the outer spherical surface 28 of the inner race member 22, as shown in FIGS. 1 and 2. The second ball groove tracks 30 form a series of ball engaging meridian race grooves of the gothic arch type for engaging portions of the bearing balls 20.

Each of the first ball groove tracks 18 is aligned with one of the second ball groove tracks 30 and traps therebetween one of the bearing balls 20 in a known manner such as to permit the angular movement of the shaft 24 interconnected with the inner race member 22 relative to the integral shaft 14 of the outer race member 12. The bearing balls 20 transfer rotational torque between the integral shaft 14 and the shaft 24 in a known manner. If desired, a spherical cage 42 may be provided between the outer spherical surface 28 of the inner race member 22 and the spherical cavity 16 of the outer race member 12 to trap the bearing balls 20 in a known manner.

According to prior art methods, the inner and outer race members 22 and 12 are formed by a casting or forging process and the first ball groove and second ball groove tracks 18 and 30 are formed, respectively, thereon by a subsequent grinding or machining operation using a grinding or machining tool. This grinding or machining operation results in a considerable amount of wear on the grinding or machining tool, requiring frequent replacement of the grinding tool. Thus, the production machinery used to produce the inner and outer race members requires substantial down time and provides a low production rate. However, according to the present invention, the inner and outer race members 22 and 12 are modified so as to reduce the amount of wear on the machining tool, thus, increasing the production rate and reducing the down time of the production machinery.

Figure 3:
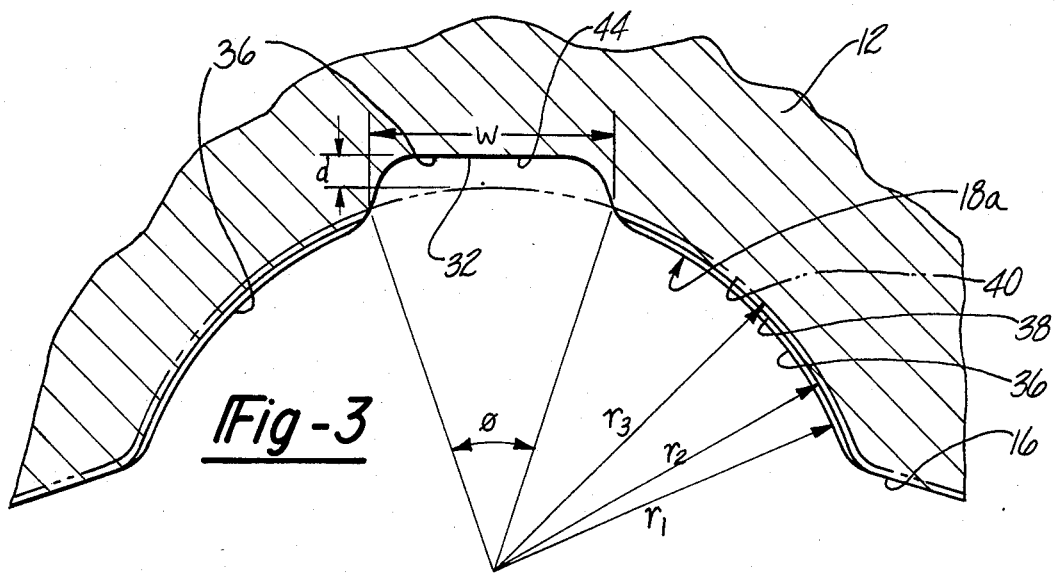
FIG. 3 is an enlarged partial sectional view of the universal joint of FIGS. 1 and 2 illustrating the relief groove thereof in detail.

As shown in FIGS. 1, 2 and 3 of the drawing, each of the first ball groove tracks 18 are provided with a small recess 32 extending along the length thereof. Similarly, as shown in FIGS. 1 and 2, each of the second ball groove tracks 30 are provided with a recess 34 formed therealong. The recesses 32 and 34 provide a relief groove to reduce the amount of wear on the grinding or machining tool used to grind or machine the first and second tracks ball groove 18 and 30 to predetermined precision shapes.

More particularly, as shown in FIG. 3 with respective to a preselected first ball groove track 18a, the recess 32 is preferably formed at the apex of the first or second ball groove track with which it is associated, since the greatest grinding or machining resistance force is experienced at the apex of the track. Thus, the grinding or machining tool used in a finishing operation on the preselected first ball groove track 18a will experience substantially less wear than is the case when the recess 32 is omitted.

The recess 32 preferably has a substantially greater width w than its depth d, relative to the preselected first ball groove track 18a so as to provide a substantial lessening of the wear on the machining or grinding tool used, without substantially weakening the outer race member 12. For example, the width w of the recess 32 may be two to four times the dimension of the depth d. Furthermore, the recess 32 extend circumferentially about a portion of the preselected first ball groove track 18a such as to define a predetermined angle theta θ of arc relative to the preselected first ball groove track. The preselected angle theta θ is chosen such as to minimize the wear on the machining or grinding tool yet permit a sufficient remaining surface for the contact between the preselected first ball groove track 18a and the bearing ball 20 disposed therein. In the example illustrated, the preselected angle theta θ is approximately twenty degrees (20°) though it may range from approximately ten degrees to approximately thirty degrees (10°-30°) of arc.

According to the method of the present invention, the outer race member 12 is initially formed by a casting or forging process, having the preselected first ball groove track 18a formed therein having a formed surface 36 with a formed radius $r_1$. A subsequent grinding or machining operation is performed on the preselected first ball groove track 18a, such as to produce a ground surface varying within preselected tolerances between a minimum ground surface 38 having a minimum ground radius $r_2$ and a maximum ground surface 40 having a maximum ground radius $r_3$. The depth d of the recess 32 is selected so as to exceed the difference between the maximum ground radius $r_3$ and the formed radius $r_1$, so that the grinding or machining tool never encounters the base 44 of the recess 32.

The remaining first ball groove tracks 18 and second ball groove tracks 30 of the inner and outer race members 22 and 12, respectively, are formed in an analogous manner to the formation of the preselected first ball groove track 18a, as described above.

It should be noted that the method according to the present invention is more advantageously applied to the outer race member 12 than it is to the inner race member 22. The first ball groove tracks 18 for the outer race member 12 are typically proportioned, relative to the bearing balls 20, such that the bearing balls engage a surface of the ball groove track generally not including the apex of the track. This is done so as to maximize the amount of bearing surface between the bearing balls 20 and the outer race member 12. Thus, the removal of a porton of the first ball groove tracks 18, by the provision of a recess 32 in each of the tracks, removes a portion of the first ball groove track not experiencing any load. Thus, the method according to the present invention, when applied to the manufacture of an outer race member 12 of a constant velocity universal joint 10, increases the effective life of the grinding or machining tool used by removing that portion of the formed surface 36 of the first ball groove tracks 18 that offers the greatest resistance to the machining or grinding tool without affecting the functional engagement between the bearing ball 20 and the first ball groove track 18 associated therewith.

In contrast, the second ball groove tracks 30 of the inner race member 22 are typically proportioned in a manner providing substantial surface contact adjacent the apex of the second ball groove track. Accordingly, when an inner race member 22 is made according to the method of the present invention, as described above, the area of greatest contact between the bearing ball 20 and the second ball groove track 30 associated therewith will be on either side of the recess 34.

Therefore, for some applications, only the outer race member 12 would be formed according to the method of the present invention while the inner race member 22 would be formed according to prior art methods. Alternatively, the recess 34 formed in each second ball groove track 30 of the inner race member 22 may be formed at locations other than the apex of the second ball groove track. For example, two recesses, not shown in the drawing, may be formed in each of the second ball groove tracks 30, the two recesses being disposed a predetermined angular distance away from the apex of the second track associated therewith, on opposite sides of the apex.

The above description constitutes the best mode contemplated by the inventor hereof at the time of filing for carrying out the present invention. The above detailed description is merely exemplary of the present invention since variations therefrom within the spirit of the present invention will be apparent to those skilled in the art after reading the above description in conjunction with the drawing appended hereto. For example, the grinding or machining step according to the present invention may be accomplished by using a single pass or a multiple pass with a grinding wheel. Such variations are included within the intended scope of the claims appended hereto.

What is claimed as novel is as follows:

1. A method of forming a precision ball race groove track in a race member of a universal joint, said method comprising the steps of:

forming said race member with a formed ball race groove track and with a recess groove extending along said formed ball race groove track, said recess groove having a base that will not come into contact with a finishing tool used to finish machine said ball race groove track; and finish machining said formed ball race groove track to a predetermined precision shape to produce said precision ball race groove track by moving said ball race groove track into contact with the finishing tool such that the finishing tool contacts said ball race groove track to thereby finish machine said ball race groove track without coming into contact with said base of said recess groove extending along said formed ball race groove track.

2. The method as claimed in claim 1 wherein said race member comprises a spherical inner race member, said spherical inner race member comprising a plurality of ball engaging ball groove tracks, said precision ball race groove track comprising at least one of said plurality of ball engaging ball groove tracks.

3. The method as claimed in claim 1 wherein said race member comprises a spherical outer race member, said spherical outer race member comprising a plurality of ball engaging ball race groove tracks, said precision ball race groove track comprising at least one of said plurality of ball engaging race groove tracks.

4. The method as claimed in claim 1 wherein said recess groove extends along the apex of said formed ball race groove track.

5. The method as claimed in claim 1 wherein said recess groove has a width substantially larger than its depth relative to said formed ball race groove track.

6. The method as claimed in claim 1 wherein said recess groove has a predetermined depth substantially larger than the depth of said predetermined precision shape obtained by said finish machining step.

7. The method as claimed in claim 1 wherein said recess groove extends circumferentially between ten and thirty degrees of arc relative to said formed ball race groove track.

8. A method of forming an outer race member of a universal joint having an inner race member and a plurality of ball engaging race groove tracks in said inner and outer race members, said method comprising the steps of:

forming a cavity in said outer race member, said cavity having a plurality of spaced apart ball race groove tracks formed therein, each of said plurality of spaced apart ball race groove tracks having a recess groove formed in the apex thereof, said recess groove having a base that will not come into contact with a finishing tool used to finish machine said ball race groove track; and finish machining each of said plurality of spaced apart ball race groove tracks to a predetermined precision shape to produce a plurality of precision ball race groove tracks by moving said ball race groove track into contact with the finishing tool such that the finishing tool contacts said ball race groove track to thereby finish machine said ball race groove track without coming into contact with the base of said recess groove extending along each of said plurality of spaced apart ball race groove tracks.

9. The method as claimed in claim 8 wherein each said recess groove has a width substantially larger than its depth relative to the respective one of said plurality of spaced apart ball race groove tracks associated therewith.

10. The method as claimed in claim 8 wherein each said recess groove has a predetermined depth substantially larger than said predetermined precision shape obtained by said finish machining step.

11. The method as claimed in claim 8 wherein each said recess groove extends circumferentially between ten and thirty degrees of arc relative to the respective one of said plurality of spaced apart ball race groove tracks associated therewith.

12. A method of forming an inner race member of a universal joint having an outer race member and a plurality of spaced apart ball engaging race groove tracks in said inner and outer race members, said method comprising the steps of:

forming an inner race member having an outer spherical surface and a plurality of spaced apart ball race groove tracks formed thereon, each of said plurality of spaced apart ball race groove tracks having a recess groove formed in the apex thereof, said recess groove having a base that will not come into contact with a finishing tool used to finish machine said ball race groove track; and finish machining each of said plurality of spaced apart ball race groove tracks to a predetermined precision shape to produce a plurality of precision ball race groove tracks by moving said ball race groove track into contact with the finishing tool such that the finishing tool contacts said ball race groove track to thereby finish machine said ball race groove track without coming into contact with the base of said recess groove extending along each of said plurality of spaced apart ball race groove tracks.

13. The method as claimed in claim 12 wherein each said recess groove has a width substantially larger than its depth relative to the respective one of said plurality of spaced apart ball race groove tracks associated therewith.

14. The method as claimed in claim 12 wherein each said recess groove has a predetermined depth substantially larger than said predetermined precision shape obtained by said finish machining step.

15. The method as claimed in claim 12 wherein each said recess groove extends circumferentially between ten and thirty degrees of arc relative to the respective one of said plurality of spaced apart ball race groove tracks associated therewith.

* * * * *

UNITED STATES PATENT AND TRADEMARK OFFICE
CERTIFICATE OF CORRECTION

PATENT NO. : 4,611,373
DATED : September 16, 1986
INVENTOR(S) : Daniel Wesley Hazebrook It is certified that error appears in the above-identified patent and that said Letters Patent is hereby corrected as shown below:

Column 1, line 47, delete "relatived" and insert ---- relative ----.

Column 2, line 12, delete "apx" and insert ---- apex ----.

Column 4, line 54, delete "tracks". Same line, after "groove" insert ---- tracks ----.

Column 5, line 48, delete "porton" and insert ---- portion ----.

In the Abstract

Line 4, delete "ball" second occurrence.

Line 5, before "race" insert ---- ball ----.

Line 6, delete "reducing groove" and insert ---- groove reducing ----.

Signed and Sealed this

Fourteenth Day of April, 1987

*Attest:*

DONALD J. QUIGG

*Attesting Officer*  *Commissioner of Patents and Trademarks*